Figure 1:
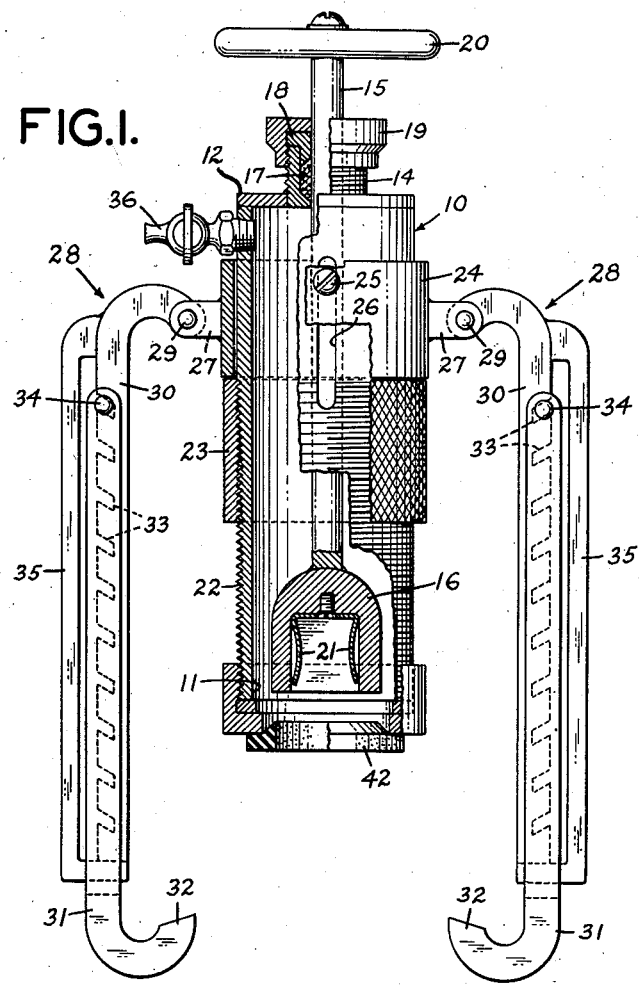

June 2, 1953  S. J. SAWICKI  2,640,492

DEVICE FOR TESTING FLUID PRESSURE LINES

Filed Nov. 14, 1949

INVENTOR.
STANLEY J. SAWICKI
BY
Campbell, Brumbaugh, Free & Graves
HIS ATTORNEYS.

Patented June 2, 1953

2,640,492

UNITED STATES PATENT OFFICE 2,640,492

DEVICE FOR TESTING FLUID PRESSURE LINES

Stanley J. Sawicki, East Hempstead, N. Y.

Application November 14, 1949, Serial No. 127,152

2 Claims. (Cl. 137—319)

The present invention relates to devices for testing fluid pressure lines and more specifically to a novel and highly effective testing device of this character which enables a fluid line to be tested without taking it out of service.

In the previous practice, pressure readings on a low pressure line supplying gas to a building for heating or illuminating purposes could not be made without first shutting off the service valve which is usually located where the line enters the building from the street. This resulted in considerable inconvenience to customers using gas from the line, since gas appliances in the building had to be turned off before the service valve could be shut down, and then turned on again and checked after service had been restored upon completion of the tests on the pressure line.

It is an object of the invention, accordingly, to provide new and improved means whereby a line carrying a fluid under pressure can be tested without taking the line out of service.

Another object of the invention is to provide new and improved fluid pressure line testing apparatus of the above character which is capable of being quickly and easily assembled to and disassembled from a fluid pressure line.

These and other objects are attained, according to the invention, by providing a testing device which is adapted to be assembled temporarily to a fluid pressure line over a removable plug inserted in an opening therein. In the assembled position, the device cooperates with the outer wall of the pressure line to form a fluidtight chamber into which the plug extends, suitable gasket means being provided to insure a fluidtight joint between the device and the pressure line. Mounted in the chamber is suitable wrench means into which the plug is adapted to be received. The wrench means is carried by an actuator rod which extends through the device so as to enable actuation of the wrench means from the outside of the chamber, suitable packing means being provided to maintain the latter fluidtight. Valve means may be mounted in the wall of the chamber so that fluid entering therein upon removal of the plug may be sampled or tested in any desired manner.

It will be understood, therefore, that the novel testing device of the invention enables a fluid pressure line to be tested without taking it out of service and without exposing servicemen to any undue hazards.

Figure 2:
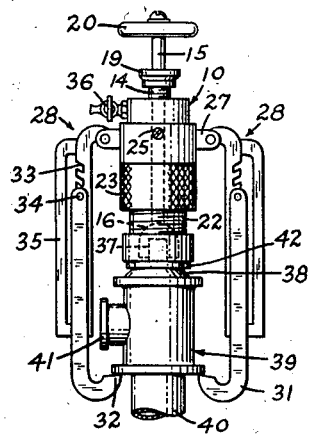

Additional objects and advantages of the invention will be apparent from the following detailed description of a typical embodiment thereof, taken in conjunction with the accompanying drawings in which:

Fig. 1 is a view in elevation, partly in section, of fluid pressure line testing apparatus constructed according to the invention; and Fig. 2 is a view showing the testing device of Fig. 1 assembled over the plug in a conventional service T in a fluid pressure line.

In the typical form of the invention shown in Fig. 1, the testing device comprises an elongated tubular member 10 which has an opening 11 at one end thereof and is closed at the other end by a closure member 12. Formed on the closure member 12 is an externally threaded sleeve 14 through which extends a shaft 15 having wrench means such as a socket wrench 16, for example, secured at the lower end thereof within the tubular member 10. The joint between the shaft 15 and the inside of the sleeve 14 is maintained fluidtight in any suitable manner as by means of suitable packing material 17 held in place by a gland 18 which is retained in position by a cap 19 screwed on the sleeve 14, for example.

The shaft 15 may be provided with a suitable actuator such as a handwheel 20, for example, by means of which the socket wrench 16 may be rotated and translated within the tubular member 10 as required to remove a plug in a fluid pressure line in the manner described below. The socket wrench 16 may be provided with suitable means such as spring clips 21, for example, to facilitate removal of a plug after it has been unscrewed from the fluid pressure line to be tested.

Formed on the outside of the tubular member 10 is a running thread 22 on which is threaded a nut 23. The nut 23 may be knurled or otherwise roughened so that it can be turned easily by hand. Mounted on the tubular member 10 between the closure member 12 and the nut 23 is a sleeve 24. The sleeve 24 may be mounted on the tubular member 10 for a limited longitudinal movement without rotation with respect thereto and to this end it may be provided with a set screw 25 which extends into a longitudinal slot 26 formed in the outside wall of the tubular member 10.

On opposite sides of the sleeve 24 are formed a pair of lugs 27 to which a pair of arms 28 are pivotally secured at 29 for movement towards and away from the tubular member 10. Each of the arms 28 comprises a portion 30 which is pivotally mounted on a lug 27 and a portion 31 having an inwardly curving hook 32 formed at one end thereof, and means are provided for coupling the portions 30 and 31 to one another at different locations with respect to each other so as to permit adjustment of the lengths of the arms 28 within a predetermined range. Thus, the arm 30 may be provided with a plurality of slots 33 along the length thereof into which a pin 34 carried by the arm portion 31 is adapted to be received. Preferably, the arm portion 31 is divided into two forks, only one of which is shown in Fig. 1, which lie on opposite sides of the arm portion 30 and form bearings for the pin 34. A longitudinally extending member 35 may be formed on the arm portion 30 for the purpose of preventing complete separation of the arm portions 30 and 31.

Suitable valve means such as a pet cock 36 is mounted on the tubular member 10 so as to provide communication with the interior thereof to enable fluid contained therein to be tested as required.

In one mode of operation, the testing device of the invention is adapted to be mounted over the usual closing plug 37 which is screwed into a reducer 38 threaded into one end of a conventional service T 39, the other end of which is connected to the gas line 40 entering a building from the street, for example. The center leg 41 of the T supplies gas to customers in the building.

In operation, the plug 37 is first loosened with a wrench of conventional type. The tubular member 10 is then placed over the reducer 38 as shown in Fig. 2, a conventional gasket 42 or other suitable packing being interposed between the lower end of the tubular member 10 and the reducer 38 so as to insure a fluidtight joint. The pins 34 on the arm portions 31 are then moved into the appropriate slots 33 so that the inwardly curving hooks 32 lie beyond the inlet head of the run of the T, as shown in Fig. 2. The nut 23 is then turned in the counterclockwise direction so as to move the sleeve 24 upwardly with respect to the tubular member 10 until the latter is tightly mounted on the reducer 38. At this time the pet cock 36 may be closed. The handwheel 20 is then manipulated to bring the socket wrench 16 over the plug 37 and it is then turned in the counterclockwise direction until the plug 37 has been removed. When this occurs, the handwheel 20 may be raised to remove the plug 37 away from the opening in the reducer, thus permitting gas from the pressure line 40 to enter the tubular member 10. Samples of the gas within the tubular member 10 may then be obtained for testing by opening the pet cock 36 which may be connected to suitable testing apparatus such as a manometer if the gas pressure is to be determined, for example.

After the desired tests have been made, the handwheel 20 is pushed downwardly until the plug 37 is again seated in the opening in the reducer 38 and the handwheel 20 is turned in the clockwise direction until it has been screwed in a reasonable distance. The testing device may then be removed by turning the nut 23 in the clockwise direction, after which the nut 37 can be tightened down by means of a conventional wrench, for example.

From the foregoing, it will be understood that the invention provides a novel and highly effective device for testing fluid pressure lines without taking them out of service. By means of the apparatus described, a plug in a fluid pressure line may be easily removed to permit samples of the fluid in the line to be taken for test purposes without shutting down the line and without subjecting servicemen to undue hazards.

The specific embodiment described above is obviously susceptible of changes in form and detail within the spirit of the invention. For example, the socket wrench 16 may have various shapes depending upon the shapes of the plugs which are to be removed. Further, the testing device is not limited to lines carrying gas, but it may be used effectively on other types of fluid pressure lines such as those adapted to transport liquids, for example. Other modifications will be apparent to those skilled in the art. The specific form of the invention disclosed herein, therefore, is not to be regarded as imposing any limitations whatsoever upon the scope of the following claims.

I claim:

1. In apparatus for testing fluid pressure lines, the combination of a tubular member having an opening at one end and being closed at its other end, socket wrench means disposed in said tubular member and having actuator means extending through said closed end of the tubular member, means for maintaining a fluidtight joint between said actuator means and the closed end of said tubular member, spring clip retaining means mounted in said socket wrench, valve means mounted on said tubular member and adapted to provide communication with the interior thereof, a pair of longitudinally extending arms mounted on said tubular member, each of said arms comprising one portion pivotally mounted with respect to said tubular member, another portion having an inwardly extending hook formed at one end thereof, and cooperating means on said portions for coupling them together at different locations with respect to each other so as to permit adjustment of the lengths of said arms within predetermined limits, and cooperating screw threaded means forming part of said tubular member and facilitating adjustment of the distance between said hooks and the opening in said tubular member.

2. In apparatus for testing fluid pressure lines, the combination of a tubular member having an opening at one end thereof and being closed at its other end, socket wrench means disposed in said tubular member and mounted on a shaft extending through the closed end of said tubular member for rotation and translation in the latter, actuator means mounted on said shaft outside of the tubular member, means for maintaining a fluidtight joint between said shaft and the closed end of said tubular member, means forming an external running thread on said tubular member, nut means threaded on said external running thread, a sleeve member slidably mounted on said tubular member between the closed end of the latter and said nut means, a pair of longitudinally extending arms pivotally mounted on opposite sides of said sleeve member for movement towards and away from said tubular member, each of said arms comprising one portion pivotally mounted at one end on said sleeve member, another portion having an inwardly extending hook formed at one end thereof, and cooperating means on both of said portions for coupling them together at different locations with respect to each other so as to permit adjustment of the lengths of said arms within limits, and valve means mounted on said tubular member and providing communication with the interior thereof.

STANLEY J. SAWICKI.

References Cited in the file of this patent

UNITED STATES PATENTS

| Number | Name | Date |
|---|---|---|
| 45,183 | Sexton | Nov. 22, 1864 |
| 242,322 | Holloran | May 31, 1881 |
| 602,289 | Kemp | Apr. 12, 1898 |
| 660,525 | Burritt | Oct. 23, 1900 |
| 1,017,821 | Swickard | Feb. 20, 1912 |
| 1,832,106 | Ernst | Nov. 17, 1931 |
| 2,092,941 | Trefney | Sept. 14, 1937 |
| 2,151,594 | Grantham | Mar. 21, 1939 |
| 2,477,663 | Sexton | Aug. 2, 1949 |